United States Patent
Gross

(10) Patent No.: US 10,800,534 B2
(45) Date of Patent: Oct. 13, 2020

(54) PASSENGER SEAT SYSTEM FOR A MEANS OF TRANSPORT

(71) Applicant: Airbus Operations GmbH, Hamburg (DE)

(72) Inventor: Claus-Peter Gross, Hamburg (DE)

(73) Assignee: Airbus Operations GmbH (DE)

( * ) Notice: Subject to any disclaimer, the term of this patent is extended or adjusted under 35 U.S.C. 154(b) by 129 days.

(21) Appl. No.: 16/127,858

(22) Filed: Sep. 11, 2018

(65) Prior Publication Data

US 2019/0092476 A1    Mar. 28, 2019

(30) Foreign Application Priority Data

Sep. 27, 2017  (DE) .................. 10 2017 122 389

(51) Int. Cl.
| | |
|---|---|
| *B64D 11/06* | (2006.01) |
| *B60N 2/015* | (2006.01) |
| *B60N 2/10* | (2006.01) |

(52) U.S. Cl.
CPC ........ *B64D 11/064* (2014.12); *B60N 2/01508* (2013.01); *B60N 2/10* (2013.01); *B64D 11/0648* (2014.12); *B64D 11/0696* (2013.01)

(58) Field of Classification Search
CPC .............. B64D 11/064; B64D 11/0696; B64D 11/0648; B60N 2/01508; B60N 2/10
(Continued)

(56) References Cited

U.S. PATENT DOCUMENTS

| 3,452,834 A | * | 7/1969 | Gaut | .................. B60N 2/42736 |
| | | | | 180/271 |
| 3,582,133 A | * | 6/1971 | DeLavenne | .............. B60N 2/10 |
| | | | | 296/68.1 |

(Continued)

FOREIGN PATENT DOCUMENTS

| DE | 198 51 392 A1 | 5/1999 |
| DE | 20 2004 015 211 U1 | 12/2004 |

(Continued)

OTHER PUBLICATIONS

Fischer + Entwicklungen GmbH & Co KG: Component Maintenance Manual, Attendant Seat NG, Part No. 1021-()-B-(). Müller-Armack-Str. 4, 84034 Landshut, Germany, (Sep. 29, 2015) Firmenschrift.

*Primary Examiner* — Milton Nelson, Jr.
(74) *Attorney, Agent, or Firm* — Lerner, David, Littenberg, Krumholz & Mentlik, LLP

(57) ABSTRACT

A passenger seat system for a means of transport has a carrier structure which can be attached, fixedly with respect to a structure, and a seat having a seat frame being displaceable and arrestable on the carrier structure, a bottom side lying on the carrier structure, and a top side holding a seat surface. The seat frame has an arresting device on the bottom side and has an operating unit coupled to the arresting device. The operating unit is movable into an arresting position and an unlocking position. The arresting device has an arresting body movable perpendicularly with respect to the carrier structure and which can be moved into an engagement position and a release position. An arresting mechanism mechanically directly couples the arresting device to the operating unit such that the position of the arresting body is determined exclusively by the position of the operating unit.

19 Claims, 6 Drawing Sheets

(58) Field of Classification Search
USPC .......................... 297/216.2, 216.19, 216.16
See application file for complete search history.

(56) References Cited

U.S. PATENT DOCUMENTS

| | | | |
|---|---|---|---|
| 4,639,106 A * | 1/1987 | Gradin | G03B 21/00 |
| | | | 348/E5.143 |
| 5,169,091 A | 12/1992 | Beroth | |
| 5,730,492 A * | 3/1998 | Warrick | B60N 2/4221 |
| | | | 297/216.2 |
| 5,871,318 A | 2/1999 | Dixon et al. | |
| 7,455,276 B2 | 11/2008 | Frey | |
| 9,663,232 B1 | 5/2017 | Porter et al. | |
| 2007/0253762 A1* | 11/2007 | Hudson | B64D 11/0696 |
| | | | 403/83 |
| 2008/0191115 A1 | 8/2008 | Stubbe | |
| 2016/0194085 A1 | 7/2016 | Stubbe | |
| 2018/0194476 A1 | 7/2018 | Gross | |

FOREIGN PATENT DOCUMENTS

| | | |
|---|---|---|
| DE | 103 41 624 A1 | 4/2005 |
| DE | 10 2013 108 540 A1 | 2/2015 |
| DE | 10 2015 116 414 A1 | 3/2017 |

\* cited by examiner

PASSENGER SEAT SYSTEM FOR A MEANS OF TRANSPORT

FIELD OF THE INVENTION

The invention relates to a passenger seat system for a means of transport, and to a means of transport, in particular an aircraft, having a passenger cabin and having a passenger seat system installed therein.

BACKGROUND OF THE INVENTION

The passenger cabin of a means of transport, for example of a passenger aircraft, commonly has a construction determined by the operator of the means of transport. The construction may relate in particular to a class division, which is associated with individual seat spacings and a particular number and arrangement of other devices. To realize individual seat spacings, a carrier structure is commonly provided on a cabin floor, which carrier structure permits a rastered fastening of passenger seats and other fixtures. A carrier structure of said type may for example comprise a seat rail arranged on a floor of the cabin, which seat rail is equipped with openings through which a longitudinal slot extends. Fastening means may be arranged at these openings, which fastening means are connected to the passenger seats or other devices.

It is moreover known for fastening means for passenger seats and other fixtures to be provided which permit quick actuation without the use of tools. An operator of the means of transport is thus provided with the facility to quickly change the construction of the cabin in accordance with demand, and adapt seat spacings or class divisions for example in accordance with the mission.

Concepts for realizing a quickly releasable fastening of said type exist. For example, DE 10 2015 116 414 A1 presents a passenger seat system having an arresting device which is arranged on a seat frame and which has a resiliently mounted arresting body which is movable from an arresting position into a release position by means of a Bowden cable. In the arresting position, the arresting body snaps into a corresponding opening, whereas, in the release position, the arresting device is released from the carrier structure.

BRIEF SUMMARY OF THE INVENTION

The use of a resiliently mounted arresting body, and the introduction or snapping thereof into an opening of a carrier structure by means of spring force, is mechanically very simple. However, the service life of a spring suitable for this purpose, which pushes the arresting body securely into the opening and holds it in the opening, may sometimes be too short for an intended service life of the means of transport. If a spring were to exhibit a mechanical defect, this can have the effect that the respective seat, or the respective seat row, is temporarily rendered unusable.

An aspect of the invention relates to a passenger seat system which permits a quick reconfiguration of a cabin and, at the same time, furthermore exhibits a longer service life.

A passenger seat system for a means of transport is proposed, having at least one carrier structure which can be attached, fixedly with respect to a structure, in the interior of the means of transport, and has at least one seat which has a seat frame, which seat frame is displaceable and arrestable on the carrier structure and has a bottom side, which lies on the carrier structure, and a top side, which holds a seat surface. The seat frame has an arresting device on the bottom side and has an operating unit, which is coupled to the arresting device, at a position averted from the bottom side. The operating unit is movable at least into an arresting position and an unlocking position. The arresting device has an arresting body which is movable perpendicularly with respect to the carrier structure and which can be moved into an engagement position and a release position. An arresting mechanism mechanically directly couples the arresting device to the operating unit such that the position of the arresting body is determined exclusively by the position of the operating unit.

The carrier structure is to be understood as a base for the fastening of passenger seats and other devices in the cabin of the means of transport. Said carrier structure is a component or an arrangement of components which, by means of the fastening thereof, is attached fixedly with respect to a structure in the interior of the means of transport. The carrier structure may in particular have two floor rails arranged parallel to one another, which are also known as seat rails, and which have a fastening raster. Alternatively or in addition to this, the carrier structure may also have slide rails or slide rail attachments for fastening to a floor rail in order to permit the sliding movement of passenger seats and other devices.

The carrier structure may have a fastening raster in the form of depressions or openings which are arranged with predefined spacings with respect to one another on the carrier structure. Said depressions or openings permit the insertion of the arresting body in order, when the arresting body is in engagement, to prevent movement of the arresting device on the carrier structure. The depressions or openings preferably project to a top side of the carrier structure, such that an arresting body can engage into a depression or opening from above the carrier structure. The carrier structure, the depressions or openings and the arresting bodies must, in particular in an aircraft, be designed such that approval-relevant 16 G load tests can be passed. The carrier structure is therefore normally connected fixedly to the structure of the means of transport, and thus permits an adequate introduction of load into the structure.

As mentioned above, the carrier structure may be suitably equipped with guide devices in order to permit easier displacement of a passenger seat or of another device. Said guide devices could be integrated directly into the carrier structure, or, for example in the case of a retrofit solution for existing carrier structures, such as for example floor rails, retroactively arranged on these. The function of the guide could be realized for example by means of a preferably centrally arranged slot of a conventional floor rail as carrier structure. Such floor rails are known for example as Douglas rails. A guide device could likewise be realized by means of an additionally or alternatively provided separate sliding guide with two profile cross sections which are coordinated with one another and which engage into one another and which are displaceable along one another.

The seat frame of the at least one seat may correspond to a conventional seat frame for the respective means of transport. In particular, the seat frame may have multiple mutually spaced-apart frame legs, which stand on the carrier structure and which hold bearing elements for bearing seat cushions. In passenger aircraft, for example, a type of construction of a seat frame which has four legs composed of a metallic material, the profile cross section of which has projections for stiffening purposes, has become established. The frame legs may, in cross-sectional regions subjected to relatively low load, be equipped with openings or recesses for the purposes of reducing weight. The bearing elements held by the frame legs could for example comprise one or two horizontally arranged tubes. In the configuration of the seat frame, provision could also be made for multiple seats to be arranged on one single seat frame. It would consequently be possible for the bearing elements to also extend in a lateral direction considerably beyond the seat frame.

In the consideration below, an upper side, which holds a seat surface, of the seat frame is referred to as "top side", whereas a lower side, which is connected to the carrier structure, is referred to as "bottom side". The height of the seat frame and thus the approximate vertical position of the top side of the seat frame are determined by a corresponding seat height for a passenger seat.

The arresting device is to be understood as an apparatus which permits selective arresting of the seat frame to the carrier structure, which apparatus should be releasable as quickly as possible and as far as possible without great expenditure of force, but should be very reliably capable of being arrested again and subjected to the full load on which the design of the seat frame is based.

The operating unit is a device averted from the carrier structure. Said operating unit is preferably arranged on a top side of the seat frame, and therefore so as to face towards a user. It should be possible for the arresting device to be reliably activated or released by means of the operating unit, wherein this should preferably be performed without the use of tools. The operating unit may have in particular a handle, a lever, a button or some other actuating element that can be moved between predefined positions by a user. The coupling with the aid of the arresting mechanism transmits the movement from the operating unit to the arresting device in order to move the arresting body situated thereon.

By contrast to the situation in the above-cited prior art, the arresting mechanism realizes a rigid coupling of the operating unit and the arresting device. Here, the rigid coupling is to be understood to mean that a movement of the arresting body is caused exclusively and directly by the movement of the operating unit. In other words, the position of the arresting body has no degree of freedom if the position of the operating unit is predefined.

This has the particular advantage that a bidirectional transmission of force between the operating unit and the arresting body is realized. The position of the arresting body is thus not dependent on the acting force of a spring, and a possible defect of a spring cannot impair the function of the arresting device. Additionally, a user is, by means of the operating unit, provided with clear feedback regarding the position in which the arresting body on the bottom side of the seat frame is situated. For example, if the seat frame is not precisely oriented on the carrier structure, and if an arresting body is not aligned with a raster opening provided in the carrier structure, the arresting body cannot be moved fully from its release position assumed during the displacement into an arresting position which arrests the seat frame on the carrier structure. Consequently, the operating unit likewise cannot be moved as far as the arresting position, and the user is made aware of the imprecise positioning. On the other hand, a user can directly feel or haptically perceive when an arresting body is arranged in the respective opening.

It would furthermore be possible for the arresting device, the arresting mechanism and/or the type and installation position of the operating unit to be selected such that a seat cushion situated directly thereabove cannot lie fully on the top side when the arresting body is not fully engaging into the carrier structure and consequently the operating unit is not in the arresting position. An offset with respect to the adjacent seat cushions is clearly evident and on-board personnel can visually easily identify that the respective seat frame is not arrested.

Altogether, by means of the passenger seat system according to an embodiment of the invention, a reliable and quick arresting action without the use of tools, and a quick release, of a passenger seat in a means of transport is made possible. The above-stated features make it possible to realize a longer service life, and the successful arresting of an arresting body is not dependent on the force action of a spring.

In an advantageous embodiment, the arresting device has a bushing with an internal thread, and the arresting body has an external thread. The arresting mechanism is designed to transmit a rotation from the operating unit either to the arresting body or to the bushing. The threads of the bushing and of the arresting body are designed to move the arresting body, in the event of rotation, perpendicularly with respect to the carrier structure. The arresting mechanism may consequently be composed of an arrangement of shafts and joints or other torque-transmitting means which can convert a pivoting movement or similar of the operating unit into a rotation of the arresting body. By introduction of the rotation at the arresting body, the arresting body can perform an axial movement owing to the external thread, which engages into the internal thread of the bushing, of the arresting body. On the other hand, it would also be possible for the bushing to be mounted so as to be rotatable and for the arresting body to be mounted so as to be exclusively displaceable in an axial direction, such that, upon introduction of a rotation at the bushing, the arresting body is moved in the axial direction. By means of the intermeshing threads, clear position control of the arresting body can be achieved.

Preferably, the internal thread of the bushing and the external thread of the arresting body are of self-locking design. The friction angle of the thread flights is consequently selected such that an axial movement of the arresting body does not automatically lead to a rotation of the arresting body or of the bushing, which is transmitted to the operating unit. Thus, the arresting of the operating unit for the prevention of vibration-induced movements can be realized with little effort.

In an alternative embodiment, the thread is not of self-locking design, such that a transmission of the movement of the arresting body to the operating unit is possible. Thus, a pressure spring can nevertheless be used to assist the detent engagement movement of the arresting body into the carrier structure. It would consequently be possible for the operating unit to be moved into and subsequently firmly held or fixed in a release position in order to release the operating unit, or release a fixing mechanism which holds the operating unit, approximately when the desired position is reached. It would then be possible by means of the pressure spring, which acts on the arresting body and pushes the latter in the direction of the carrier structure, to realize an automatic detent engagement into an opening aligned with the arresting body. By means of the operating unit which moves with the arresting body, it is clearly signaled to the user that an arresting position has been reached. Should the pressure spring exhibit a defect, the arresting device can nevertheless be used.

In one advantageous embodiment, the arresting body has a first positive-locking means into which a second positive-locking means, which is coupled rotationally conjointly to the arresting mechanism, engages. The first positive-locking means and the second positive-locking means are designed to transmit a rotation while being variable in terms of axial position with respect to one another. Since the arresting body must be capable of moving axially between the arresting position and the release position, an adequate transmission of the rotation should be ensured by the positive-locking means. For this purpose, the two positive-locking means are adapted to one another such that a movement of the arresting body along the predefined distance is made possible, and a complete transmission of rotation occurs.

In a preferred embodiment, one out of the first positive-locking means and the second positive-locking means has a depression with a first profile cross section, and the other out of the first positive-locking means and the second positive-locking means has a projection with a second profile cross section. Here, the outer contour of the second profile cross section is adapted to an inner contour of the first profile cross section such that the projection can be positioned displaceably in the depression while maintaining at least radial areal contact between the two positive-locking means for the transmission of torque. The first profile cross section should accordingly as far as possible be of non-circular design and have, for example, at least one eccentrically arranged contact surface which, at least in regions, does not lie perpendicular to a connecting line to the corresponding axis of rotation. In this way, radial areal contact can be realized which is suitable for transmitting a torque. Here, the contact surface should extend along the intended displacement direction, such that the axial movement is made fully possible. By insertion of the other positive-locking means with corresponding second profile cross section, a transmission of the rotation is consequently possible, while the axial position of the two positive-locking means with respect to one another is variable at least in a certain provided range. The second positive-locking means may consequently be mounted rotatably at a fixed position without restricting the mobility of the arresting body.

It is conceivable for the first profile cross section to be arranged on a part assigned to the arresting mechanism, and for the second profile cross section to be arranged on the arresting body. This may however also be reversed.

The arresting mechanism may have a first bevel gear pair which converts a rotational movement of the operating unit about a first axis of rotation into a rotation about a second axis of rotation, wherein the first axis of rotation and the second axis of rotation are arranged transversely with respect to one another, and wherein the arresting mechanism furthermore has a connecting shaft which is coupled to the bevel gear pair. The bevel gear pair may be arranged for example on a top side of the seat frame. The operating unit may for example permit a rotation about a horizontal first axis of rotation. The operating unit may, for this purpose, be arranged for example below a seat surface and have an operating lever which can perform a pivoting movement about the first axis of rotation. Here, it would be possible for the operating lever to assume multiple angular positions in a range of 180°. It would for example be possible for the operating lever to be arranged on a shaft piece and to extend, in a first angular position, from the shaft piece in the direction of a front edge of the seat and, in a second angular position, from the shaft piece in the direction of a rear edge of the seat. Alternatively, it would also be possible for the operating lever to be capable of being pivoted from a region situated laterally at the outside to a region situated laterally further to the inside of the seat frame. By means of the first bevel gear pair, which could follow the shaft piece, said rotational movement is diverted to the bottom side of the seat frame by virtue of a rotation of a connecting shaft running to the bottom side of the seat frame being initiated by means of the bevel gear pair. A further diversion, or some other type of attachment to the arresting device, may be realized at the end of a connecting shaft of said type.

Preferably, on an end of the connecting shaft directed towards the bottom side of the seat frame, there is arranged a joint which connects the connecting shaft to the arresting device. For example, the second positive-locking means can be set in rotation by means of said joint. The joint can permit a diversion of the direction of rotation through a smaller angle range than the bevel gear pair. If the connecting shaft already extends from the top side of the seat frame to the bottom side, it already extends substantially vertically. A diversion can be realized very reliably with a play-free and maintenance-free joint. The design of the arresting mechanism can thus be simplified somewhat.

In one advantageous embodiment, the connecting shaft runs in a region of the seat frame between front and rear seat legs. Outwardly, an unchanged outer contour of the seat frame or of the seat legs can be maintained. A protective apparatus or a paneling for protecting a connecting shaft is required at most below the seat frame.

In an alternative embodiment, the connecting shaft may also run on a rear side of a rear seat leg. In certain cases, the integration may be easier to realize. This variant could however lead to a greater structural space requirement at the rear side of the seat frame.

Instead of a joint on the connecting shaft at the bottom side of the seat frame, it would also be possible to use a second bevel gear pair, which transmits the rotation to the arresting body. It is thus possible for relatively large angle ranges between the connecting shaft and the axis of rotation of the arresting body or the bushing or some other component of the arresting device to be permitted.

In one advantageous embodiment, the operating unit has an operating lever which is rotatable about a first axis of rotation. Preferably, the operating unit furthermore has a blocking device which blocks the operating unit. By means of the blocking device, it is for example possible for the operating lever to be held in a presently set position.

The blocking device can be realized by virtue of the operating lever being mounted so as to be displaceable along the first axis of rotation and being guided in a guide slot arranged radially with respect to the operating lever, which guide slot has two lanes which are arranged opposite one another and which are formed parallel to the first axis of rotation and into which the operating lever is insertable. When the operating lever is engaged, the lanes reliably prevent the further rotation of the operating lever. The blocking device is furthermore, by means of the guide slot, of very simple design.

The invention furthermore relates to a means of transport having a cabin and having at least one passenger seat system with the above-described features formed therein.

The means of transport may be an aircraft. The means of transport may furthermore have service units above passenger seats, wherein the number of service units corresponds at least to the maximum possible number of passenger seats situated therebelow. A service unit could be understood to mean a device which has various displays, for example for a seatbelt fastening command or a non-smoking signal, a loudspeaker for announcements, an air nozzle, a container for oxygen masks and the like, and which correlates in each case with passenger seats situated therebelow. It is particularly advantageous if the number of service units corresponds at least to a maximum possible number of passenger seats situated therebelow in the respective region, such that, in the event of displacement of the passenger seats or in the event of a change of the seat spacings, a displacement of the service units is not necessary. It is furthermore conceivable to provide a number of service units which even exceeds the maximum possible number of passenger seats. Coverage of each passenger seat can consequently be ensured regardless of the spacings formed in between them. Depending on the respective region in the cabin that is to be equipped with the passenger seat system, it is possible to realize a certain overdeterminacy by virtue of the number of service units slightly exceeding the maximum number of passenger seats, wherein an excess of 5 to 10% would be conceivable, though this may also be greater or smaller.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference designations are used for identical or similar objects.

DETAILED DESCRIPTION

Figure 1A:
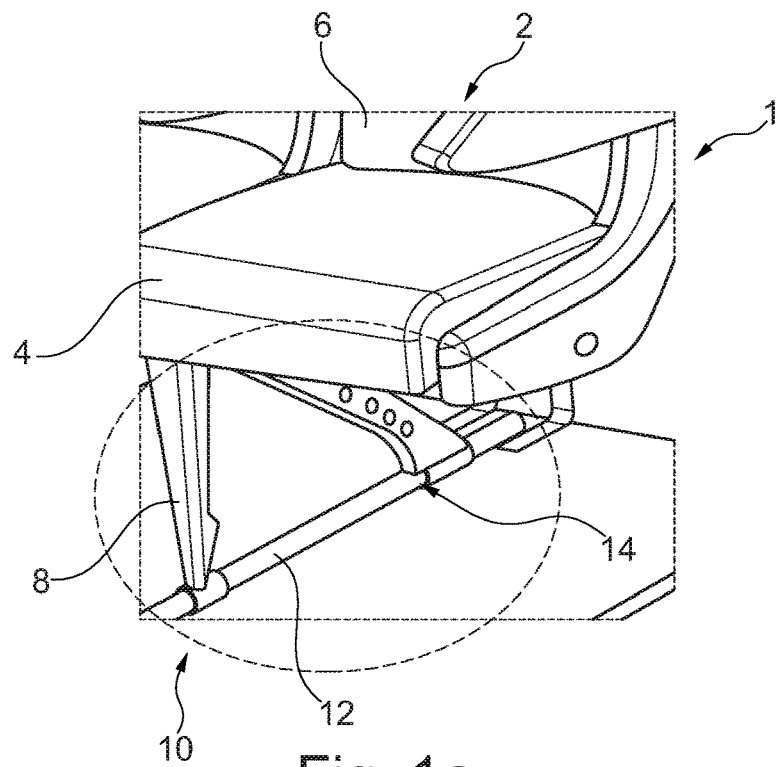
FIGS. 1a to 1g disclose multiple different views of a passenger seat system.
Figure 1B:
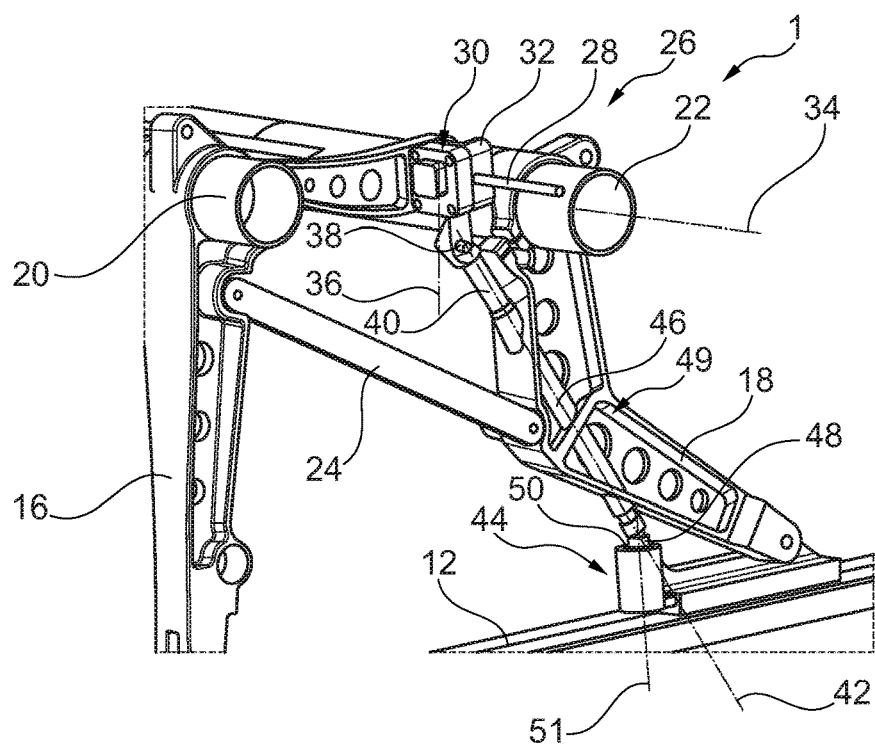

FIGS. 1a to 1g show a passenger seat system 1 in various views. FIG. 1a shows a passenger seat 2 with a seat surface 4, with a backrest 6, and with a seat frame 8, which seat frame lies with a bottom side 10 on a carrier structure 12 and is connected to the latter by means of an arresting device 14. The details will be presented in various illustrations in the further following figures.

The seat frame 8 has front seat legs 16, rear seat legs 18 and bearing tubes 20 and 22 held by the seat legs 16, 18. A diagonal strut 24 connects the front seat legs 16 to the rear seat legs 18 and increases the stiffness of the seat frame 8. Illustrated on a top side 26 of the seat frame 8 is a part of an operating unit, which has a first shaft 28. This can, by means of an operating lever (not illustrated here) or some other operating element, be set in rotation.

The first shaft 28 is adjoined by a first bevel gear pair in the form of a first bevel gear pair or bevel gear mechanism 30, which in the illustration shown is encapsulated by a housing 32. A rotation of the first shaft 28 about a first axis of rotation 34 is consequently diverted by means of the first bevel gear 30 to realize a rotation about a second axis of rotation 36, which in the situation shown is perpendicular to the first axis of rotation 34 and is directed to the carrier structure 12 or the bottom side 10 of the seat frame 8.

Arranged so as to follow the first bevel gear pair 30 is a first joint 38, which introduces the rotation into a connecting shaft 40. The latter has a slightly angled direction in relation to a vertical, and rotates about a third axis of rotation 42, which is directed to the arresting device 44. The connecting shaft 40 runs for example through a bushing 46 integrated into the rear seat leg 18, and ends in a second joint 48. This conducts the rotation onward into a first positive-locking means 50 (presented below) and rotates the latter about a fourth axis of rotation 51. For the sake of simplicity, the first joint 38 and the second joint 48 may be designed in the form of a cardan joint.

An aim of the arresting mechanism 49, which is composed of the abovementioned elements proceeding from the first shaft 28 to the second joint 48, is the rigid, direct coupling of the movement of an operating element to the arresting device 44.

Figure 1C:
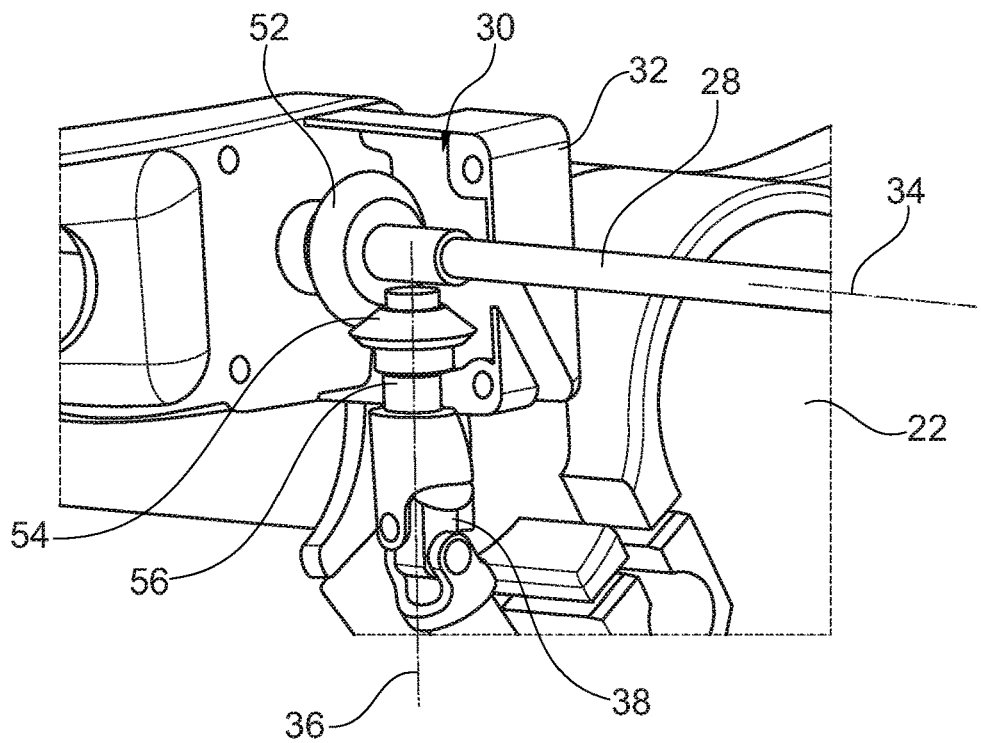
Figure 1D:
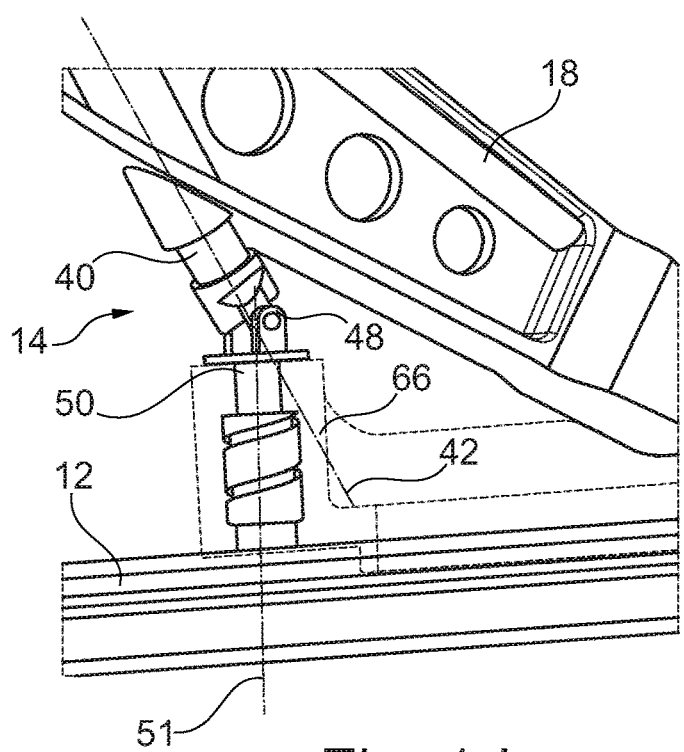
Figure 1E:
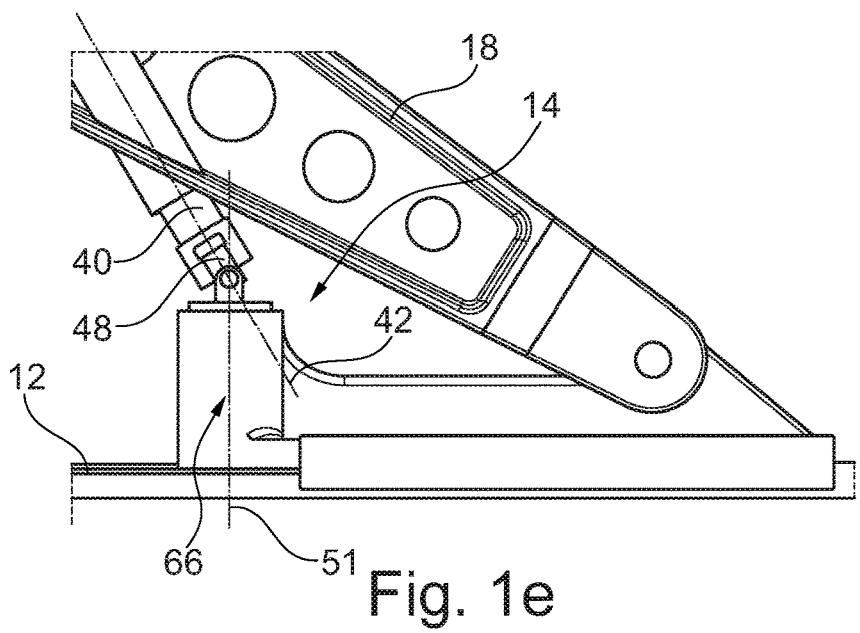
Figure 1F:
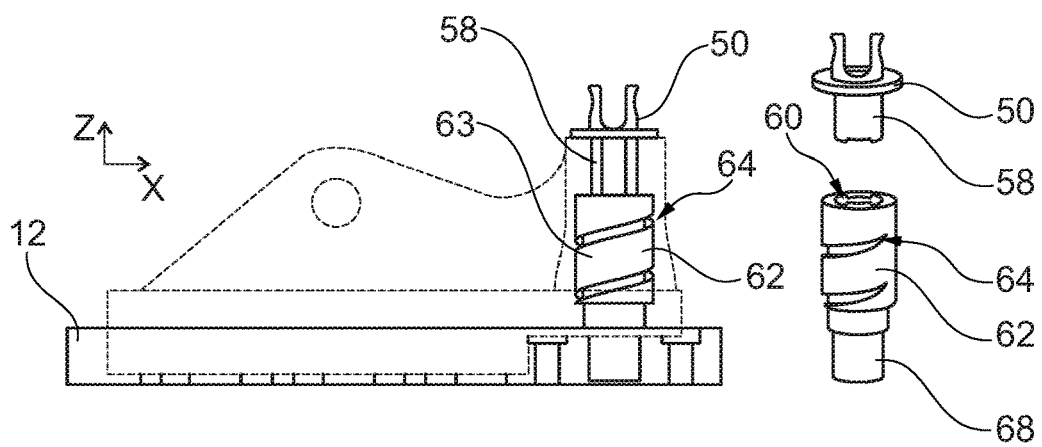

FIG. 1c shows the first shaft 28 with the first bevel gear mechanism 30 in a more detailed illustration. Here, a first bevel gear 52 is arranged directly on the first shaft 28 and drives a second bevel gear 54, which has a somewhat smaller diameter than the first bevel gear 52. Therefore, when the first shaft 28 rotates, a more pronounced rotation of the second bevel gear 54 occurs, which transmits the rotation via a first attachment shaft 56 into the first joint 38.

Via the connecting shaft 40, the rotation is introduced into the second joint 48, and there, drives the first positive-locking means 50. This is illustrated in more detail in FIG. 1f.

Here, a projection or an elongate element 58 is shown which engages into a correspondingly formed depression 60 as second positive-locking means in an arresting body 62. In an axial direction, the profile cross section of the elongate element 58 and the profile cross section of the depression 60 are constant and fully correspond to one another, such that, even in the event of an axial displacement of the first positive-locking means 50 relative to the arresting body 62, a transmission of rotation is realized. For this purpose, multiple contact surfaces 65 are provided in the depression 60, which contact surfaces give rise to areal contact of the elongate element 50 in order to permit a transmission of torque. The contact surfaces 65 are oriented parallel to the fourth axis of rotation 51.

The arresting body 62 has, on its outer side, a thread 64 which corresponds with a thread 63 within a bushing 66 of the arresting device 14. A rotation of the engagement body 62 therefore also results in an axial movement of the arresting body 62.

Figure 1G:
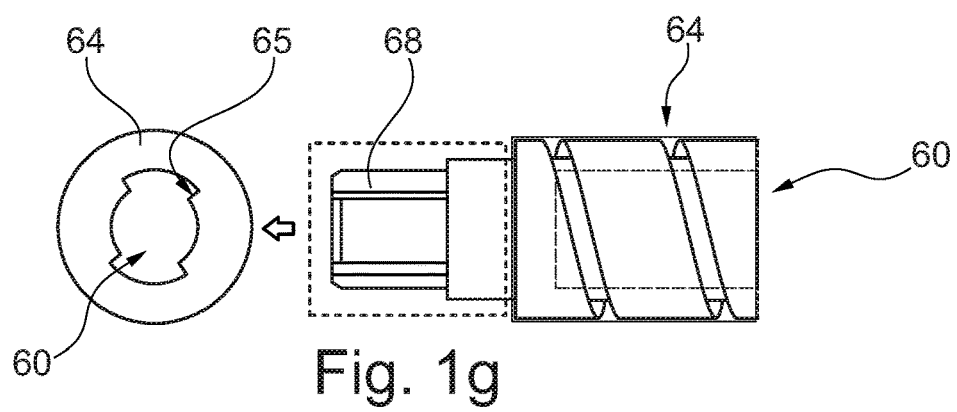

As shown in more detail in FIG. 1g, the arresting body 62 has, on an end opposite the depression 60, a projection 68 which can engage into a corresponding opening of the carrier structure 12. Rotation of the first shaft 28 consequently results in a rotation of the arresting body 62 and an axial movement of the projection 68 for the purposes of establishing a connection or releasing a connection to a depression in the carrier structure.

Figure 2A:
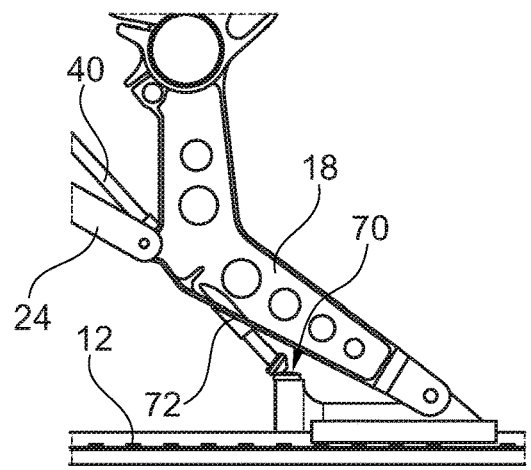
FIGS. 2a to 2c show the integration of a connecting shaft on a front side or a rear side of a rear seat leg.
Figure 2B:
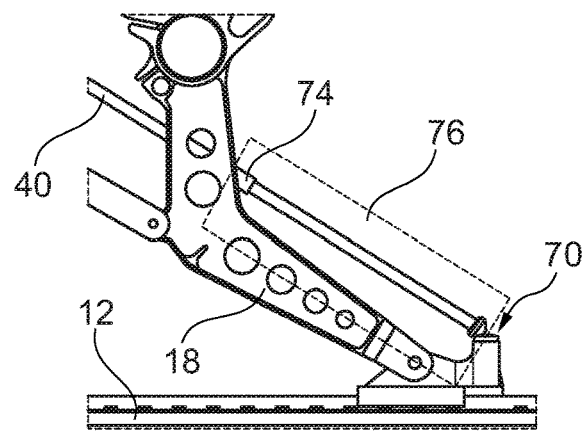
Figure 2C:
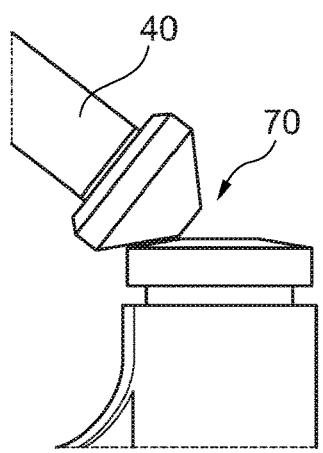

In an alternative embodiment, instead of the second joint 48, use may also be made of a second bevel gear mechanism 70, which in FIG. 2a is arranged in front of the rear seat leg 18. The connecting shaft 40 runs in this case for example in a bushing 72, which is integrated into the rear seat leg 18 at the front side thereof. FIG. 2b shows an alternative arrangement behind the rear seat leg 18. Here, a bushing 74 is integrated on an upper section of the rear seat leg 18 and serves for the guidance and mounting of the connecting shaft 40. In this case, a paneling 76 should be provided which encloses the connecting shaft 40 and the second bevel gear pair 70.

Figure 3A:
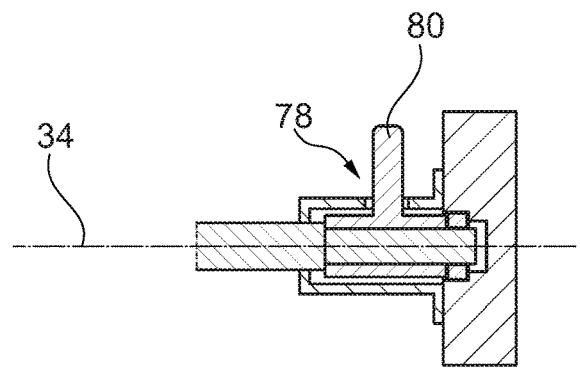
FIGS. 3a to 3c show different operating units and integration thereof on the seat frame.
Figure 3A:
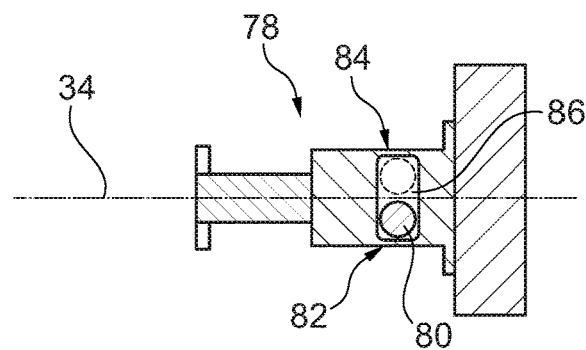
Figure 3B:
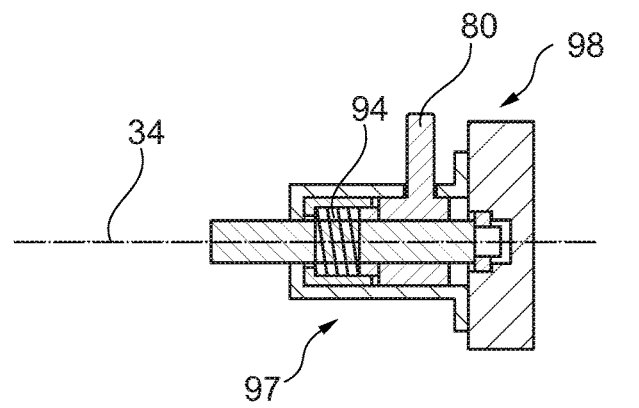
Figure 3B:
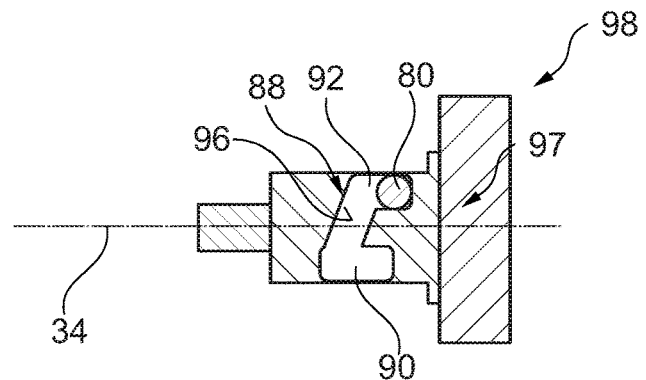

FIGS. 3a and 3b illustrate two different operating units 78 and 98. FIG. 3a shows the operating unit 78 with an operating lever 80 which is pivotable between a release position 82 and an arresting position 84 in a simple linear guide slot 86. In the illustration shown here, the operating lever is not combined with a blocking device.

In FIG. 3b, the operating lever 80 runs in a guide slot 88 which is of somewhat more complex form and which has two lanes 90 and 92 which are arranged offset with respect to one another and which run parallel to the first axis of rotation 34. The operating lever 80 can be moved along the first axis of rotation 34, counter to the pressure of a pressure spring 94, along the lanes 90 and 92 to a transition region 96, through which the operating lever 80 can be transferred into the respective other lane 90 or 92 by means of rotation. The transition region runs obliquely with respect to the perpendicular to the first axis of rotation 34, such that the operating lever 80 is at all times forced into the lane 92, which represents for example a locking position, the combination of pressure spring 34 and the guide slot 88 shaped as shown is consequently a blocking device 97.

Figure 3C:
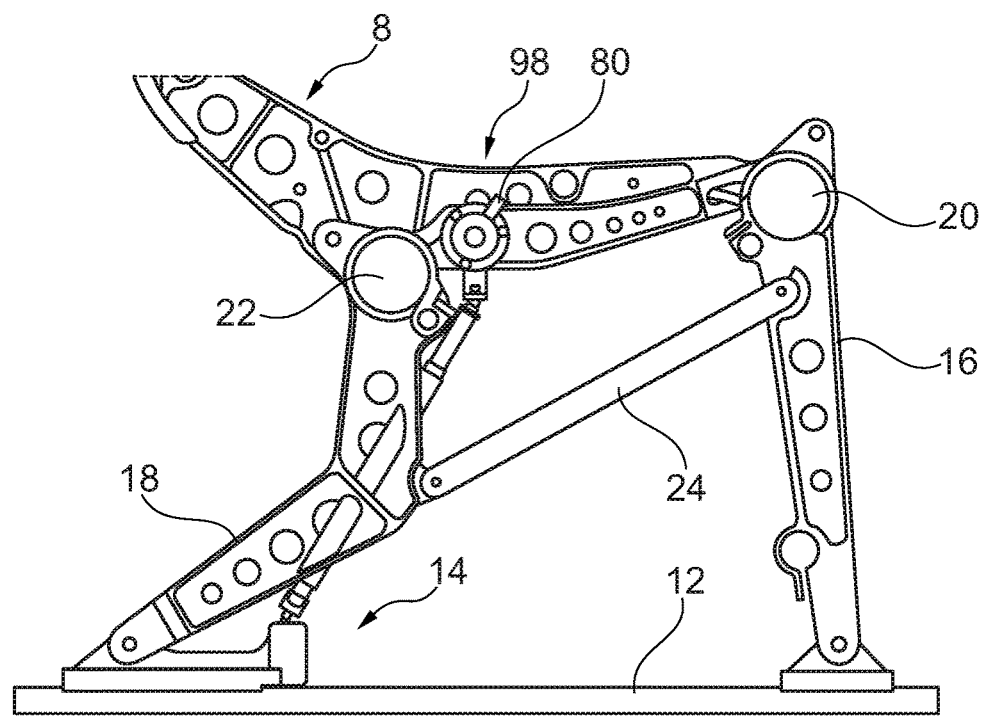

FIG. 3c shows an operating unit 98 in an installed illustration on one side of the seat frame 8. The operating lever 80 can be pivoted between a position directed to the front bearing tube 20 and a position directed to the rear bearing tube 22, and can in the process release or arrest the arresting device 44.

Figure 4:
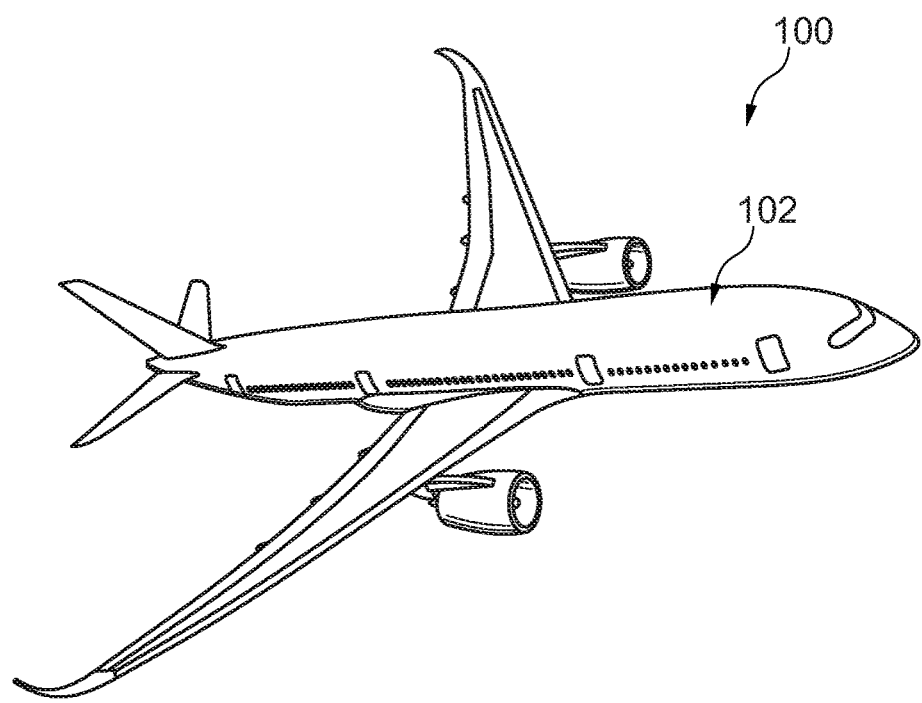
FIG. 4 shows an aircraft with a passenger seat system installed therein.

Finally, FIG. 4 shows an aircraft 100 with a cabin 102 formed therein, in which cabin at least one passenger seat system as presented above is installed.

It is additionally pointed out that "having" does not rule out other elements or steps, and "a" or "an" do not rule out a multiplicity. It is also pointed out that features that have been described with reference to one of the above exemplary embodiments may also be used in combination with other features of other exemplary embodiments described above. Reference designations in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat system for a means of transport, comprising:
   at least one carrier structure configured to be attached, fixedly with respect to a structure, in the interior of the means of transport; and
   at least one seat having a seat frame, the seat frame being displaceable and arrestable on the carrier structure and having a bottom side lying on the carrier structure, and a top side holding a seat surface,
   wherein the seat frame has an arresting device on the bottom side and has an operating unit coupled to the arresting device, at a position averted from the bottom side,
   wherein the operating unit is movable at least into an arresting position and an unlocking position,
   wherein the arresting device has an arresting body movable perpendicularly with respect to the carrier structure and configured to be moved into an engagement position and a release position,
   wherein an arresting mechanism mechanically directly couples the arresting device to the operating unit such that the position of the arresting body is determined exclusively by the position of the operating unit,
   wherein the arresting device has a bushing with an internal thread,
   wherein the arresting body has an external thread,
   wherein the arresting mechanism is configured to transmit a rotation from the operating unit either to the arresting body or to the bushing, and
   wherein the threads of the bushing and of the arresting body are configured to move the arresting body, in the event of rotation, perpendicularly with respect to the carrier structure.

2. The passenger seat system according to claim 1, wherein the operating unit has a blocking device blocking the operating unit.

3. The passenger seat system according to claim 1, wherein the internal thread of the bushing and the external thread of the arresting body are of self-locking design.

4. The passenger seat system according to claim 1, wherein the operating unit has an operating lever rotatable about a first axis of rotation.

5. The passenger seat system according to claim 4, wherein the blocking device is realized by virtue of the operating lever being mounted so as to be displaceable along the first axis of rotation and being guided in a guide slot arranged radially with respect to the operating lever, which guide slot has two lanes arranged opposite one another and formed parallel to the first axis of rotation and into which the operating lever is insertable.

6. A means of transport, having a cabin and having at least one passenger seat system according to claim 1 formed therein.

7. The means of transport according to claim 6, wherein the means of transport is an aircraft.

8. The means of transport according to claim 6, further comprising service units above the passenger seats, wherein a number of service units corresponds at least to a maximum possible number of the passenger seats situated therebelow.

9. A passenger seat system for a means of transport, comprising:
   at least one carrier structure configured to be attached, fixedly with respect to a structure, in the interior of the means of transport; and
   at least one seat having a seat frame, the seat frame being displaceable and arrestable on the carrier structure and having a bottom side lying on the carrier structure, and a top side holding a seat surface,
   wherein the seat frame has an arresting device on the bottom side and has an operating unit coupled to the arresting device, at a position averted from the bottom side,
   wherein the operating unit is movable at least into an arresting position and an unlocking position,
   wherein the arresting device has an arresting body movable perpendicularly with respect to the carrier structure and configured to be moved into an engagement position and a release position,
   wherein an arresting mechanism mechanically directly couples the arresting device to the operating unit such that the position of the arresting body is determined exclusively by the position of the operating unit, wherein the arresting body has a first positive-locking means into which a second positive-locking means, coupled rotationally conjointly to the arresting mechanism, engages, and wherein the first positive-locking means and the second positive-locking means are configured to transmit a rotation while being variable in terms of axial position with respect to one another.

10. The passenger seat system according to claim 9, wherein one of the first positive-locking means and the second positive-locking means has a depression with a first profile cross section, and the other of the first positive-locking means and the second positive-locking means has a projection with a second profile cross section, and wherein an outer contour of the second profile cross section is adapted to an inner contour of the first profile cross section such that the projection is configured to be positioned displaceably in the depression while maintaining at least radial areal contact between the two positive-locking means for the transmission of torque.

11. A means of transport, having a cabin and having at least one passenger seat system according to claim 9 formed therein.

12. The means of transport according to claim 11, wherein the means of transport is an aircraft.

13. The means of transport according to claim 11, further comprising service units above the passenger seats, wherein a number of service units corresponds at least to a maximum possible number of the passenger seats situated therebelow.

14. A passenger seat system, for a means of transport, comprising:

at least one carrier structure configured to be attached, fixedly with respect to a structure, in the interior of the means of transport; and at least one seat having a seat frame, the seat frame being displaceable and arrestable on the carrier structure and having a bottom side lying on the carrier structure, and a top side holding a seat surface, wherein the seat frame has an arresting device on the bottom side and has an operating unit coupled to the arresting device, at a position averted from the bottom side, wherein the operating unit is movable at least into an arresting position and an unlocking position, wherein the arresting device has an arresting body movable perpendicularly with respect to the carrier structure and configured to be moved into an engagement position and a release position, wherein an arresting mechanism mechanically directly couples the arresting device to the operating unit such that the position of the arresting body is determined exclusively by the position of the operating unit, wherein the arresting mechanism has a first bevel gear pair converting a rotational movement of the operating unit about a first axis of rotation into a rotation about a second axis of rotation, wherein the first axis of rotation and the second axis of rotation are arranged transversely with respect to one another, and wherein the arresting mechanism further comprises a connecting shaft coupled to the first bevel gear pair.

15. The passenger seat system according to claim 14, wherein, on an end of the connecting shaft directed towards the bottom side of the seat frame, there is arranged a joint connecting the connecting shaft to the arresting device.

16. The passenger seat system according to claim 14, wherein the connecting shaft runs in a region of the seat frame between front seat legs and rear seat legs.

17. A means of transport, having a cabin and having at least one passenger seat system according to claim 14 formed therein.

18. The means of transport according to claim 17, further comprising service units above the passenger seats, wherein a number of service units corresponds at least to a maximum possible number of the passenger seats situated therebelow.

19. The means of transport according to claim 17, wherein the means of transport is an aircraft.

* * * * *